UNITED STATES PATENT OFFICE.

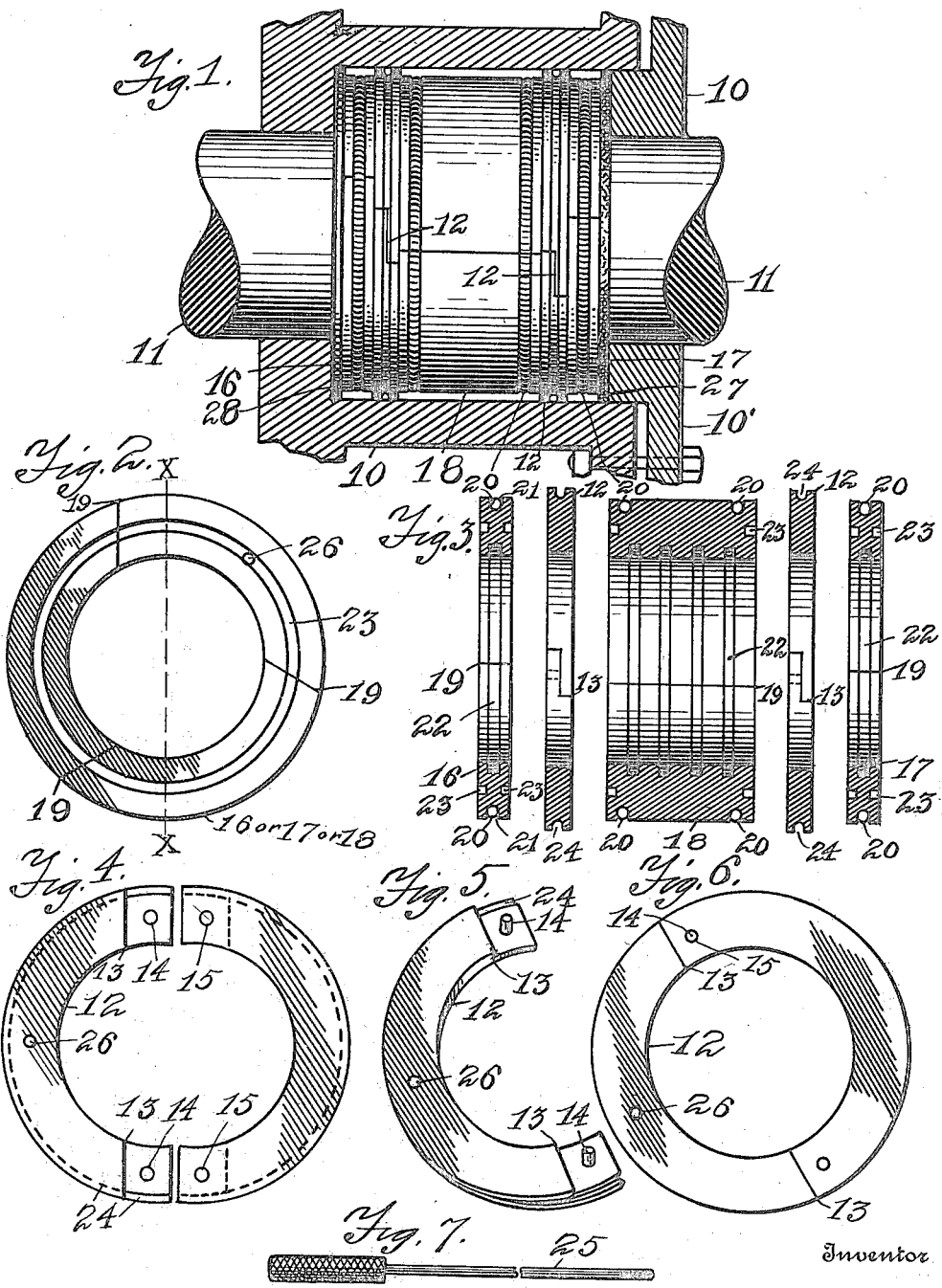

MILO HARRIS, OF JAMESTOWN, NEW YORK.

METALLIC PACKING.

1,232,028.

Specification of Letters Patent.

Patented July 3, 1917.

Application filed May 11, 1916. Serial No. 96,821.

*To all whom it may concern:*

Be it known that I, MILO HARRIS, a citizen of the United States, residing at the city of Jamestown, in the county of Chautauqua and State of New York, have invented certain new and useful Improvements in Metallic Packing, of which the following, taken in connection with the accompanying drawings, is a specification.

The invention relates to metallic packing for stuffing boxes on engines, power pumps, ice machines and similar constructions; and the object of the improvement is, first, to provide a strong and simply constructed metallic packing which is self adjusting and self alining and can be easily assembled and installed at low cost; and second, to provide a soft metal diaphragm in the inner end of the stuffing box which forms a seat for the metallic packing which seals the joint between the packing and stuffing box eliminating all steam leakage at said inner end; and the invention consists in the novel features and combinations hereinafter set forth and claimed.

In the drawings, Figure 1 is an elevation of the metallic packing on a piston rod with the stuffing box in section around the same showing the arrangement and construction of the packing. Fig. 2 is a side elevation of one of the resilient rings for the packing. Fig. 3 is a sectional view of the packing, said view being diametrical as indicated at line X X in Fig. 2 showing the construction and arrangement of the different resilient and carrier rings which make up the packing. Fig. 4 is an elevation of one of the carrier rings with the parts separated from one another; and Fig. 5 is a perspective view of one of said parts showing the pin lap joint and grooved edge; and Fig. 6 is an elevation of the two parts assembled together ready to be placed on the rod. Fig. 7 is an elevation of the tool for withdrawing the packing from the stuffing box. Fig. 8 is a detail of the joined ends of the coil springs for the resilient rings.

Like characters of reference refer to corresponding parts in the several views.

The numeral 10 designates the stuffing box which is preferably made with the gland 10′ attached thereto in the usual manner.

The numeral 11 designates a rod which moves or reciprocates, as a piston rod in an engine, with the packing thereon.

The packing consists of a pair of carrier rings which are designated by the numeral 12 and which are preferably made in two halves with the lap joint 13 therebetween at each side. A pin 14 on one lapping portion of a joint 13 enters the hole 15 in the other portion of said joint for holding the parts firmly in line, the two parts being held together by the other parts of the packing when all the parts are assembled against one another.

The carrier rings 12 are fitted to the interior of the stuffing box 10 and hold the clamping rings 16 17 and 18 firmly in line on the rod 11, thereby keeping the packing in perfect alinement so that as the rod 11 is reciprocally moved backward and forward through the packing the parts are more and more perfectly fitted to said rod 11.

The steam is held back along the rod 11 by the resilient clamping rings 16 17 and 18 which are made in three parts or sections with substantially tangential joints 19 therebetween, that is, the joints 19 are tangential to the inner surface of the ring. The rings 16 17 and 18 have grooves 21 on the outer surface and a continuous coil spring 20 in each groove to clamp the three parts onto the rod 11 with a resilient pressure. The large ring 18 has two grooves 21 and springs 20 therein, so that each end is held firmly in line adjacent to the carrier rings 12. By this arrangement it is apparent that the two narrow end rings 16 and 17 and the large central ring 18 will each independently clamp the rod 11 firmly and will hold the steam pressure back adjacent said rod 11.

The interior of each carrier ring 12 is of larger diameter than the rod 11 so that a space is provided within each of said rings to permit the rod to work freely therewithin and also provide a steam holding groove between the adjacent clamping rings. Each of the rings 16 17 and 18 also has an annular groove 22 on its inner surface to aid in holding the steam, since it is apparent that spaced contracting surfaces will have a better contact on the surface of the rod 11 than a continuous contacting surface. Also the grooves 22 and spaces within the carrier rings 12 serve to collect any dirt and aid in the lubrication since the oil gathers to some extent in said grooves and a larger amount can thus be kept in contact with the rod 11.

The steam retarding grooves 22 and 23 are provided around the inner sides and the ends of the rings 16 17 and 18. Such grooves retard the steam since it gives chance for the small amount of steam which is likely to seep into or leak through some slight interstice between the packing ring and the wall of the stuffing box or between the packing and the rod 11 a chance to expand and to find another wall without the continuance of the groove or interstice through which it came. The grooves 22 23 and 24 also give the parts as it were a number of supporting surfaces instead of one continuous surface, which it is apparent will be easier to fit to the contacting surface. The grooves 22 also reduce the frictional contact with the rod 11 and thereby make the packing much more durable. Said grooves are preferably not spaced more than one-fourth inch apart and in many cases are placed closer together so that the contacting surfaces therebetween get more perfect contact on the outer surface of the rod 11.

The carrier rings 12 are larger than the clamping rings 16 17 and 18 to allow said clamping rings room to expand and contract and for ease in fitting to the stuffing box, as well as aiding in holding the steam. A threaded hole 26 is provided in the different rings and a similarly threaded rod 25 is also provided to thereby withdraw the different rings from the stuffing box 10.

In the installation of the packing a diaphragm 28 of copper, lead or some soft metal is preferably placed in the inner end of the stuffing box 10, as shown in Fig. 1. The packing is then inserted around the rod 11 against the ring 28 in the order shown with the clamping ring 16 against the diaphragm ring 28 with its soft metal interlocking in the groove 23. One of the carrier rings 12 is then placed against the clamping ring 16 and fitting tightly against the inner wall of the stuffing box 10, the broad clamping ring 19 coming next against the carrier ring, then the second fitted carrier ring 12, then the narrow clamping ring 17, and finally a soft packing ring 27 preferably of fibrous material, though any good soft packing may be used, after which the closing plate or gland 10' of the stuffing box 10 is attached. It is apparent that the parts of the packing may be assembled around the rod 11 without removing said rod from the stuffing box, each of the parts being assembled and slipped into place one after another.

The rod 11 is at liberty to rise and fall in its different parts as it passes back and forth, and to balance itself in the stuffing box 10, since the carrier rings 12 do not contact the rod 11 and the clamping rings 16 17 and 18 do not contact the inner wall of the stuffing box 10 and are accordingly free to move along side the carrier rings 12. Thus the rod 11 may be out of line and still remain tightly packed against the escape of steam. The interior grooves 22 are preferably square thereby giving the same efficiency for their entire depth as said surface is worn away by the movement of the rod 11. This construction also gives an equal contacting surface during the process of wearing away by the rod and said square or rectangular grooves hold a larger amount of lubricant than a V-shaped groove, thereby aiding in the lubrication of the rod 11, and when said grooves 22 are spaced a short distance apart, usually about one-quarter of an inch, the amount of lubricant contained in the grooves 22 and within the space between the clamping rings formed by the non-contacting carrier rings will float the entire surface of the rod thereby aiding in the steam closure of the packing.

I claim as new:

1. A packing for rods comprising alternately arranged clamping rings and carrying rings, each clamping ring comprising freely and radially removable sections, and each carrying ring comprising separable interlocking sections secured against radial separation.

2. A packing for rods comprising alternately arranged clamping rings and carrying rings, each clamping ring comprising freely and radially removable sections and having its side faces annularly grooved and its periphery formed with a spring seat, a coiled spring for each clamping ring engaging in the peripheral seat thereof to yieldably hold the sections operative, and each carrying ring comprising interlocking sections secured against radial separation and having flat side faces abutting the grooved side faces of the clamping rings, said carrying rings having interior and exterior diameters larger than the respective diameters of the clamping rings whereby to form annular interior pockets between the clamping rings, the inner peripheries of the latter and the outer peripheries of the carrying rings being formed with steam-collecting grooves.

In testimony whereof I have affixed my signature in the presence of two witnesses.

MILO HARRIS.

Witnesses:
H. A. SANDBERG,
A. W. KETTLE.

Copies of this patent may be obtained for five cents each, by addressing the "Commissioner of Patents, Washington, D. C."